Jan. 25, 1966 R. S. POTTS 3,230,963
METHOD OF FAIL-SAFE PROCESS CONTROL
Filed Nov. 28, 1962
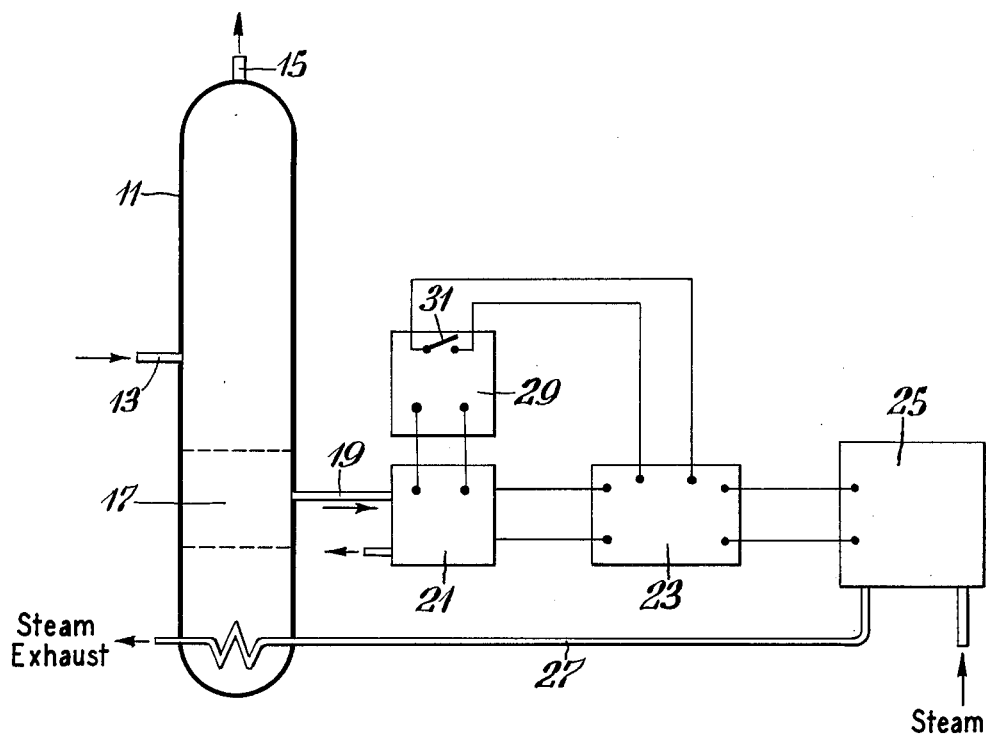
INVENTOR.
RICHARD S. POTTS
BY *Maurice W. Ryan*
ATTORNEY United States Patent Office 3,230,963
Patented Jan. 25, 1966

3,230,963
METHOD OF FAIL-SAFE PROCESS CONTROL
Richard S. Potts, St. Albans, W. Va., assignor to Union Carbide Corporation, a corporation of New York
Filed Nov. 28, 1962, Ser. No. 240,655
2 Claims. (Cl. 137—1)

The present invention relates to an improvement in process control and more particularly to a method for fail-safe operation of processes wherein cyclic type analyzer apparatus in conjunction with intermittent to continuous signal translating means, are used to effect closed loop feedback control.

The development of cyclic type analyzers suitable for plant use has given rise to the relatively wide employment of the analyzers in process control systems. Most typical of the cyclic type analyzers is the gas chromatograph or vapor fraction analyzer in which samples of multicomponent substances occurring in a process may be continually analyzed for components of interest. The samples analyzed may be of end or intermediate product or of feedstock substances involved in the process. The analytically determined condition of selected components will reflect the condition of one or more controlled variables of the process as of the time of the particular samples extraction. In accordance with the well known principles of gas chromatography, the output signals of such analyzers are in the form of intermittent signals in sets, each set of intermittent signals being related to a discrete sample analyzed and the separate signals in a set each being proportional to and thus representative of one of the components of interest in the analysis. Visual indicia of the analyzer output may thus take the form of repeated sets of successive peaks on a rectilinear coordinate graph with time as the axis of abscissas and some component-related variable, such as for example, percent concentration in the sample, as the axis of ordinates. Such a graph or chart may be produced on a recording potentiometer in accordance with conventional analytical procedures.

Control of a continuous process may be accomplished by changing the value of a controlled variable in the process or by adjusting the value of a parameter which in turn effects or tends to effect, the desired change in the controlled variable. These changes in either a controlled variable or a variable-related parameter are usually effected by variations in the value of a continuous signal applied to a controller which controls the variable or parameter. This continuous signal technique can be employed in a closed-loop feedback process control scheme incorporating a gas chromatograph or other cyclic type analyzer provided that there is also included in the control loop a periodic to continuous signal translating means which can take, as input, the analyzer output peaks and can produce an output signal which is continuous and assumes values commensurable to respective of the successively received sets of input signals or to selected discrete signals thereof. Typical of such apparatus is described in U.S. Patent No. 2,982,292, to S. T. Martin. While the patentee there describes apparatus operating on a pneumatic principle, and in fact pneumatic apparatus are widely used in such applications, the signal translating device may operate on other physical principles as persons skilled in the art will readily appreciate. Pneumatic signal translating means will be assumed for the purpose of the ensuing discussion.

Where closed loop feedback control of a process is to be achieved by means of a chromatograph or other cyclic type analyzer, the operation will generally comprehend the programmed steps of periodically extracting a multicomponent sample from the controlled zone or process unit; directing the extracted sample to the analyzer and therein analyzing it for the component or components of interest in the process; developing in the analyzer, intermittent signals each having a value proportional to some value (such as concentration) of one or more of the components comprised in the multi-component sample; directing these intermittent signals to the signal translating apparatus, wherein a value of a continuous output signal is made to change in accordance with some function of the discrete values of the intermittent signals of the successively received sets of analyzer output signals; and finally applying this continuous signal to change a controlled variable in the process or to adjust some parameter which has an effect on the controlled variable. The manner in which the intermittent signals effect changes in the value of the continuous signal may vary from one system to another. In one case, for example, the continuous signal may be made to undergo a value change whenever a preselected number of intermittent signals aggregate to some preselected value. In another arrangement the continuous signal may be made to undergo a value change when the integral of selected intermittent signals reaches some preselected value. In any case, the extent to which the continuous signal changes in value is commensurable to the values of an immediately received preceding set of intermittent signals.

Now, in respect to continuous processes generally, it may be stated that stable operation at, or as near as possible to, optimum operating conditions is the desideratum. Where closed loop feedback control according to the foregoing description is applied to a reasonably stable process, the normal changes in value of the continuous signal applied to a controller will be small changes in one direction on the other which will tend to reestablish stability smoothly and with low control inertia. If, for instance a given number of intermittent peaks or analyzer signals do not add, integrate or relate in some other chosen way to a preselected value, the result will be a change in value of the continuous signal which will, through the controller, tend to change a controlled variable or variables in the direction necessary to attain said preselected value in a subsequent analysis. Experience with a variety of continuous processes teaches that inherent stability is usual and further, that when a severe maladjustment of a controlling parameter or extraordinary change in a process variable occurs, it is more expedient and safer to shut the process down than to permit the control system to attempt unusually large corrections. If, for instance the controlled variable is the concentration of a certain component and the parameter determinative of this variable is the rate at which heat is supplied to the process, extraordinary heat rate changes effected through the controller will tend to completely upset the thermal balance of the process. In such instances process shut down is preferable to permitting control gyrations first in one direction and then in another to continue in an effort to regain stability.

Any closed loop control system will attempt to effect adjustments for all conditions obtaining within it. If an electrical or mechanical malfunction in the analyzer or some other section of the control system causes the loss of one of a set of peaks or intermittent signals, the system will tend to compensate for this just as though the absence of that peak reflected a true condition in the controlled zone and overcontrol or hunting will take place and cause unwanted upset and eventually require shutdown of a process which had in fact been operating stably. In view of this problem, the present invention was conceived on the rationale that it would be far more desirable, upon occurrence of a malfunction in the control system itself, to continue controlling the process according to the last previous value of the continuous signal applied to the controller, rather than to permit an extraordinary control effort or, alternatively, an immediate shut down.

Accordingly, the present invention provides a method for fail-safe operation of processes wherein cyclic type analyzer apparatus, in conjunction with intermittent to continuous signal translating means, are used to effect closed loop feedback control.

The invention is applicable to any process control system wherein selected of intermittent signals, each representing a value of a controlled variable in the process, are translated into a continuous signal which assumes a value according to an immediately preceding set of selected intermittent signals and said continuous signal is applied (to a controller) continuously to effect changes in said controlled variable and is a control method which comprises maintaining a value of said continuous signal according to a penultimate set of selected intermittent signals each time an immediately preceding set of selected intermittent signals is commensurable to a continuous signal value below a preselected minimum continuous signal value. The selected intermittent signals may be comprised in one or more successive sets of intermittent signals or, according to the particular process control programming involved, may comprise one signal or peak in each of successive sets of intermittent signals produced by the analyzer.

With the foregoing and other features in view, the invention will now be described in greater particularity and with reference to the single figure drawing which is a schematic arrangement of a process control system embodying one form of apparatus for performing the method of my invention.

Referring to the drawing, there is shown a production unit 11, having a feedstock inlet 13 and a product outlet 15. A particular zone 17 on the unit 11 may contain a component or components of interest in the process, the condition of which at any given time, will reflect the condition of one or more controlled variables of the process obtaining in the zone. The component or components of interest may be of a feedstock, a catalyst or an intermediate or end product of the process. Zone 17 is sampled periodically through a sampling conduit 19 extending between zone 17 of unit 11 and an analyzer 21. The frequency with which the zone 17 is sampled is determined by a programmer which may be incorporated in the analyzer but which, in any event, forms no part of this invention. A peak memory device 23 is arranged in circuit with analyzer 21 and constitutes the intermittent to continuous signal translating means. Peak memory device 23 is essentially a combination of a storage device for the intermittent output signals of analyzer 21 and an actuating apparatus for a controller 25 which connects to the device 23 output side. Typical of such a device is the signal storage and actuating apparatus described in the Martin patent, which apparatus operates on a pneumatic principle. Electrical apparatus may also be applied here. Controller 25, in accordance with particular values of the continuous signal supplied from peak memory device 23, effects changes in some process parameter such as, for example, steam flow supplied to unit 11 through steam conduit 27. A recorder 29 is also shown arranged in circuit with the analyzer 21.

The arrangement thus far described will operate in the aforedescribed manner.

To perform the fail-safe process control method according to my invention a switch 31 may be provided on recorder 29 and connected into the continuous signal changing circuitry of the peak memory device 23. Switch 31 may be normally open or normally closed depending upon the details of the peak memory device circuitry into which it is connected. Switch 31 is actuated by the recorder pen. Assuming switch 31 to be normally closed, it will open each time the recorder pen drops to zero or some other preselected minimum scale value. Thus, if a peak is lost due to an analyzer or programmer or other control system malfunction, the recorder pen will drop to zero or other minimum setting selected, switch 31 will open and disable the continuous signal changing circuitry of peak memory device 23. In the apparatus shown in FIGURE 1 of the aforementioned Martin patent, for example, the circuit disabled would be the 110 volt A.C. supply to the solenoid valve 56. Since a next occurring peak in a given set of intermittent signal peaks may reclose switch 31, it will effect this disabling step through relay means in order to keep the continuous signal changing circuitry disabled for the desired time. With its continuous signal changing circuitry thus disabled, the peak memory device 23 will continue to apply to the controller 25 a continuous signal of a value commensurable to the penultimately received set of intermittent signal values. In Martin's apparatus, for instance, the air pressure in tank 50 applied to the controller would stay at a value according to the last but one set of intermittent signals received.

Another fail-safe apparatus arrangement which has been successfully used, in conjunction with a chromatographic analyzer and a peak memory device according to FIGURE 1 of the Martin patent, comprises a normally open switch connected in the continuous signal changing circuitry and mounted so as to be cam-closed by one of the rotational members actuated by the successively received intermittent signals from the analyzer. In such an arrangement, the continuous signal changing circuitry (scil. solenoid valve 56) remains disabled until the rotational member has progressed through a predetermined arcuate movement and effects switch closure. At this point the continuous signal changing circuitry is enabled. Thus, if the intermittent signals from the analyzer aggregate or are otherwise commensurable to a value which produces a rotational movement less than a preselected minimum, the continuous signal (air output) changing apparatus stays disabled.

Several alternative apparatus arrangements may be used to effect the disabling of the continuous signal changing circuitry and the foregoing illustration and the drawing are to be considered as merely illustrative. In the light of the disclosure of my method it is conceivable that myriad conventional apparatus arrangements will suggest themselves to persons familiar with the electrical and mechanical arts. The invention therefore is properly defined in the terms of the appended claims.

What is claimed is:

1. In a method of process control wherein selected of intermittent signals, each representing a discrete value of a controlled variable in the process, are translated into a continuous signal which assumes values respectively according to an immediately preceding set of selected intermittent signals and said continuous signal is applied continuously to effect changes in said controlled variable in the process, the improvement which comprises maintaining a value of said continuous signal according to a penultimate set of selected intermittent signals each time an immediately preceding set of selected intermittent signals is commensurable to a continuous signal value below a preselected minimum continuous signal value.

2. In a method of process control wherein intermittent signals, each representing a discrete value of a controlled variable in the process, are translated into a continuous signal which assumes values according to an immediately preceding set of discrete values of the controlled variable represented by the intermittent signals and said continuous signal is applied continuously to effect changes in a process parameter controlling said controlled variable, the improvement which comprises maintaining a value of said continuous signal according to a penultimate set of discrete values of the controlled variable represented by the intermittent signals each time an immediately preceding set of discrete values of the controlled variable represented by the intermittent signals is commensurable to a continuous signal value below a preselected minimum continuous signal value.

References Cited by the Examiner
UNITED STATES PATENTS

| | | | |
|---|---|---|---|
| 2,692,581 | 10/1954 | Zieboltz | 121—47 XR |
| 2,982,292 | 5/1961 | Martin | 137—82 |
| 3,020,886 | 2/1962 | Jones | 121—47 |

M. CARY NELSON, *Primary Examiner.*

ALAN COHAN, WILLIAM F. O'DEA, ISADOR WEIL, *Examiners.*